US008703874B2

(12) United States Patent
Aberle et al.

(10) Patent No.: US 8,703,874 B2
(45) Date of Patent: Apr. 22, 2014

(54) POWDER TO HYDROPHOBISE AND ITS USE

(76) Inventors: Thomas Aberle, Nottwil (CH); [Andrei] Andrey P. Pustovgar, Moscow (RU); Franck Vallée, Huningue (FR); Paul Emmenegger, Oberkirch (CH); Dominique Schaub, Hinwil (CH)

( * ) Notice: Subject to any disclaimer, the term of this patent is extended or adjusted under 35 U.S.C. 154(b) by 136 days.

(21) Appl. No.: 13/126,698

(22) PCT Filed: Nov. 3, 2009

(86) PCT No.: PCT/EP2009/064502
§ 371 (c)(1),
(2), (4) Date: Apr. 28, 2011

(87) PCT Pub. No.: WO2010/052201
PCT Pub. Date: May 14, 2010

(65) Prior Publication Data
US 2011/0203487 A1   Aug. 25, 2011

Related U.S. Application Data

(60) Provisional application No. 61/112,037, filed on Nov. 6, 2008.

(30) Foreign Application Priority Data

Nov. 6, 2008   (EP) ..................................... 08168515

(51) Int. Cl.
  *C08J 3/12*   (2006.01)
(52) U.S. Cl.
  USPC .............................................. 525/252; 524/2
(58) Field of Classification Search
  USPC ...................................................... 524/265, 2
  See application file for complete search history.

(56) References Cited

U.S. PATENT DOCUMENTS

| | | | | |
|---|---|---|---|---|
| 4,036,658 A | * | 7/1977 | Puhringer et al. | 106/724 |
| 4,125,673 A | * | 11/1978 | Roth et al. | 428/447 |
| 4,209,432 A | * | 6/1980 | Roth | 106/287.12 |
| 4,704,416 A | | 11/1987 | Eck et al. | |
| 4,851,047 A | | 7/1989 | Demlehner et al. | |
| 5,091,002 A | | 2/1992 | Schamberg et al. | |
| 5,449,712 A | * | 9/1995 | Gierke et al. | 524/266 |
| 5,776,245 A | | 7/1998 | Thomas | |
| 5,855,667 A | | 1/1999 | Thomas | |
| 5,959,017 A | | 9/1999 | Eck et al. | |
| 6,020,403 A | * | 2/2000 | Eck et al. | 523/340 |
| 6,191,235 B1 | | 2/2001 | Eck et al. | |
| 6,214,416 B1 | * | 4/2001 | Sakagami et al. | 427/387 |
| 6,268,423 B1 | * | 7/2001 | Mayer et al. | 524/492 |
| 6,294,608 B1 | * | 9/2001 | Hager et al. | 524/838 |
| 6,756,124 B2 | * | 6/2004 | Kanamori et al. | 428/447 |
| 2002/0040666 A1 | | 4/2002 | Eck et al. | |
| 2004/0019141 A1 | | 1/2004 | Bastelberger et al. | |
| 2004/0050287 A1 | | 3/2004 | Windridge et al. | |
| 2010/0006005 A1 | * | 1/2010 | Roesch et al. | 106/287.1 |
| 2011/0166256 A1 | * | 7/2011 | Gallez et al. | 523/209 |
| 2011/0196070 A1 | * | 8/2011 | Keller et al. | 524/4 |

FOREIGN PATENT DOCUMENTS

| | | |
|---|---|---|
| DE | 195 35 833 A1 | 3/1997 |
| DE | 195 42 442 A1 | 5/1997 |
| EP | 0051150 B1 | 5/1982 |
| EP | 0228657 A2 | 7/1987 |
| EP | 0278518 A1 | 2/1988 |
| EP | 0392253 B1 | 1/1994 |
| EP | 0796826 A1 | 9/1997 |
| EP | 0741760 B1 | 11/1997 |
| EP | 0819663 B1 | 3/2001 |
| EP | 0919526 B1 | 1/2002 |
| EP | 1120384 B1 | 7/2002 |
| EP | 1394198 A1 | 3/2004 |
| EP | 1698602 A1 | 9/2006 |
| GB | 2433497 A | 6/2007 |
| WO | WO 2007/009935 A2 | 1/2007 |

OTHER PUBLICATIONS

International Search Report and Written Opinion from PCT/EP2009/064502 (Mar. 11, 2009), dated Feb. 9, 2010.
European Search Report from Application No. 08168515.8 (Nov. 6, 2008), dated Apr. 27, 2009.

* cited by examiner

*Primary Examiner* — Kelechi Egwim
(74) *Attorney, Agent, or Firm* — Robert C. Morriss

(57) ABSTRACT

The present invention relates to the use of a solid comprising at least one organosilane and a carrier material to hydrophobise mortars, wherein the organosilane has the formula $R_1Si(OR')_3$ or $R_1R_2Si(OR')_2$ wherein $R_1$ and $R_2$ are the same or different and are a linear or branched $C_1$- to $C_4$-alkyl and/or alkenyl group, OR' is an acetoxy, a $C_1$- to $C_4$-alkoxy and/or a $C_2$- to $C_6$-methoxyalkoxy and/or ethoxyalkoxy group, and the carrier material is a solid at room temperature. The amount of cement in the final formulation is zero or less than 5 wt.-%, based on the total weight of the final formulation in the dry and uncured form. Claimed are also a powder comprising the silane and a carrier with the carrier being a water-soluble polymer, dry mortar formulations containing no or less than 5 wt.-% cement, based on the dry weight of the uncured mortar formulation, as well as processes to manufacture the formulations and/or compounds.

20 Claims, No Drawings

POWDER TO HYDROPHOBISE AND ITS USE

REFERENCE TO RELATED APPLICATION(S)

This application is the U.S. National Phase of PCT/EP2009/064502 filed on Nov. 3, 2009, and claims the benefit of U.S. Provisional Application No. 61/112,037 filed on Nov. 6, 2008.

The invention relates to the use of a solid to hydrophobise mortars containing no or less than 5 wt.-% cement, a powder to hydrophobise the same, dry mortar formulations containing no or less than 5 wt.-% cement, as well as processes to manufacture the same.

Mortars containing no or less than 5 wt.-% cement, in particular cement-free mortars, have become more and more popular in recent years. Gypsum, in particular in the form of hydraulically setting calcium sulfate such as α- and β-hemihydrate or in the form of anhydrite I, II or III, is a typical representative thereof and a very common building raw material. It is used in a plurality of different formulations and embodiments. Examples are for instance use in drywall installations, where gypsum plasterboard is often used, in plastering for indoor use, in tile adhesives, in the flooring area, as well as in the handyman or do-it-yourself segment.

A major drawback to hydraulically setting gypsum materials, however, is their sensitivity to water, as it precludes exterior application or application in rooms with increased atmospheric moisture such as wet cells. For that reason it has been tried time and again to formulate gypsum products in such a way that the cured gypsum products have a hydrophobising nature and/or a reduced water absorption, in order to increase the water resistance.

Thus various technologies are described which use liquid silicon-based compounds, such as for instance silanes, siloxanes, alkoxysilanes and/or organosilanes, as hydrophobising components.

EP 1 698 602 A1 describes a gypsum mixture with improved mechanical and hydrophobic properties, containing a uniformly dispersed additive consisting of at least one alkoxysilane and/or alkoxy-functionalised polysilane and at least one salt of mineral acids and metals of Subgroups IIIB to VIII, IB or IIB, with the metal salts not standing for metal salts which catalyse the silanol condensation to any noticeable extent. For the preparation of the gypsum mixture the silane component and the metal salt are first mixed with the water in any order. Next, a gypsum paste is prepared by introducing a commercially available builder's gypsum into the aqueous mixtures.

EP 051 150 A1 describes shaped bodies formed of materials containing gypsum or containing gypsum as predominating component which have been made hydrophobic by treatment with a mixture of alkalialuminate and alkylsilanes in aqueous or aqueous-alcoholic solution. As alkyl groups ethyl, propyl or n-butyl groups are used.

EP 819 663 A1 refers to a gypsum mixture having gypsum, a first silane having the formula $(RO)_3SiR$ or $(RO)_2SiR_2$, and a second silane having the formula $(RO)_3SiR'$ or $(RO)_2SiRR'$, wherein each R may be the same or different and represents a lower alkyl group, and R' represents a lower alkyl group which is substituted by a substituent selected from an amino, amino-lower alkyl-amino or dialkylenetriamine group.

WO 2007/009935 A2 pertains to a process for the preparation of hydrophobic materials, in particular gypsum products. To this end alkylalkoxysilanes, arylalkoxysilanes, alkenylalkoxysilanes, and mixtures thereof are first of all hydrolysed under acidic conditions, as a result of which polysiloxanes are formed. These are then mixed with the mineral and/or filler, in which process optionally also a condensation catalyst may be added.

GB 2 433 497 A describes a method of preparing a hydrophobic mineral and/or filler, which comprises contacting the mineral and/or filler in powder form with a hydrolysable organosilane, water, and a catalyst for hydrolysis and condensation of the organosilane under conditions such that the organosilane is hydrolysed in the presence of the mineral and/or filler and the organosilane hydrolysis product condenses to form polyorganosiloxane in the presence of the mineral or filler.

An important drawback to such systems is that they are made available only as 2-component systems, with the powdery gypsum components having to be mixed with further liquids in addition to water, such as liquid silane-based compound, on the building or fabrication site immediately prior to application. This is an additional expense and can lead to quality problems. Therefore, it is a major advantage when all necessary raw materials, in particular also the hydrophobising components, are present in powder form. This makes it possible to prepare a dry mortar mixture at the factory which only has to be mixed with water on site before being processed.

In order to overcome this problem, EP 919 526 A1 proposes a building material comprising a hydrophobic powder containing silicic acid as the support material and hydrophobic components that are liquid at 10° C. and contain an organo-silicon compound, solvent and/or water and emulsifier, wherein the powder contains 5-80 wt.-% organosilicon compound. EP 1 120 384 A1 describes a hydrophobising agent for gypsum-bound building material containing a support material comprising an organic or inorganic powder having a BET surface area of greater than 5 $m^2/g$ and at least one organopolysiloxane having Si-bonded hydrogen atoms, wherein each molecule has at least one Si-bonded hydrogen atom.

Another approach is taken by EP 741 760 A1, which refers to a water-redispersible polymer powder composition which is made of water-insoluble organic polymers and contains 0.1 to 30% of one or more silicon compounds which are dispersible in water and have a boiling point at normal pressure of >160° C. The silicon compounds can be silanes, polysilanes, oligosiloxanes, carbosilanes, polycarbosilanes, carbosiloxanes, polycarbosiloxanes and polysilylene disiloxanes. And EP 1 394 198 A1 discloses a hydrophobically modified polymer composition comprising a polymer in the form of an aqueous polymer dispersion or water-redispersible polymer powder, organic silicon compounds, and fatty acids and/or their derivatives.

EP 228 657 A2 describes aqueous redispersible powders which contain a water-soluble polymer and at least one organic silicon compound, wherein at least 50 wt.-% of the organic silicon compound(s) used to prepare these powders have a boiling point of at least 150° C. at 1,020 hPa. The powders are obtained by spray-drying aqueous mixtures of the water-soluble polymers and the organic silicon compound and may be used with hydraulic binders such as cement and lime. However, it is not mentioned that such products can be used in gypsum-based systems, and in particular it is not mentioned to hydrophobise them. This is, however, described in EP 278 518 A1 by a process for the preparation of hydrophobic masses from gypsum, wherein use is made of organopolysiloxanes with Si-bonded hydrogen in the form of powders. They are obtained by spray drying a mixture of water, a water-soluble, film-forming polymer with a cloud point between 35° C. and 98° C., and the organopoly-siloxane.

DE 195 35 833 A1 discloses a process for the preparation of water-redispersible powders based on ethylenically unsaturated polymers which are modified with additives. The additives are liquid at a temperature of 50° C. or below and are applied to a pulverulent carrier material and the resulting powder is added after drying. Example 6 describes the adsorption of methyl-triethoxysilane onto Rotisorb as carrier material, followed by the obtained product being mixed with a redispersible powder stabilised with polyvinyl alcohol. Rotisorb is a universal absorber made by Roth from rock flour, which is a water-insoluble silicate mixture. Application examples 7 to 9 are based on a ceramic tile adhesive containing Portland cement. Mortar formulations with no or less than 5 wt.-% cement are not disclosed, nor is the use of the powder from Example 6. Furthermore, organosilanes adsorbed on inorganic carriers as disclosed in Example 6 reveal a distinctly worse wettability than organosilanes having water-soluble polymers as carrier material, in particular when the organosilanes are mixed with the water-soluble polymer in water, followed by drying of this mixture.

DE 195 42 442 A1 refers to a process for preparing water-redispersible powder compositions comprising organosilicon compounds by spray drying an aqueous mixture comprising one or more organosilicon compounds and one or more water-soluble organic polymers, wherein part of antiblocking agent is injected into the upper third of the dryer simultaneously with the aqueous mixture and the remainder of the antiblocking agent is introduced into the dried powder stream or mixed into the dried powder. The organosilicon compound can be chosen from a long list of silicon-containing compounds, including any mixture thereof. The powder composition additionally may comprise a water-soluble polymer and an anticaking agent, wherein it is preferred that the amount of water-soluble polymer is 5 to 40 wt.-%, based on the total weight of the organosilicon compound, which corresponds to a ratio of organosilicon compound to water-soluble polymer of between 95.2:4.8 and 71.4:28.6. The powders are disclosed to be applicable everywhere, amongst others for purposes wherein their hydrophobic activity is used. They are additionally said to be suitable for use in a group of many different building compositions. In the examples powders containing an organopolysiloxane and polyvinylalcohol are made which are established to be caking-resistant and free-flowing All these approaches where the organosilicon compounds are in powder form cover a very broad range of different organosilicon compounds for use in basically any building material or—when focusing on hydrophobising gypsum—they refer to organopolysiloxanes with Si-bonded hydrogen in the form of powders. The latter, however, can easily react to form hydrogen, which, in the presence of oxygen and a spark, can lead to explosions or to bubble formation in the matrix they are worked into.

Furthermore, it was found that while commercial, octyla-lkoxysilane-based powders as described in EP 228 657 A2 lead to an excellent hydrophobicity of cement-based building compounds, they do not show any effect on hydrophobicity and/or reduced water up-take in cement-free formulations such as gypsum-based mortars.

It was therefore an object of this invention to provide a material which can be easily mixed into dry mortar formulations containing no or less than 5 wt.-% cement and which, upon being mixed with water and allowed to dry, has to deliver excellent hydrophobicity and/or reduction of water absorption. Furthermore, the material, as well as the mortar formulations containing the material, needs to be storage stable and must show good wettability upon mixing with water. Furthermore, the drawbacks of the state of the art must be minimised or avoided.

Surprisingly, it was found that this objective can be obtained by using a solid comprising at least an organosilane and a carrier material to hydrophobise mortars, wherein a) the organosilane has the formula

$$R_1Si(OR')_3 \quad (I)$$

or

$$R_1R_2Si(OR')_2 \quad (II)$$

wherein $R_1$ and $R_2$ are the same or different and are a linear or branched $C_1$- to $C_4$-alkyl and/or alkenyl group, OR' is an acetoxy, a $C_1$- to $C_4$-alkoxy and/or a $C_2$- to $C_6$-methoxyalkoxy and/or ethoxyalkoxy group, and b) the carrier material is solid at room temperature, and wherein the weight ratio of the organosilane to the carrier material is between about 70:30 and about 1:99, the solid is in the form of a powder, a granulate and/or a flake, and the amount of cement in the final formulation is zero or less than 5 wt.-%, based on the total weight of the final formulation in the dry and uncured form.

Alternatively, the object is achieved by a process to hydrophobise mortars by mixing at least one solid comprising at least one organosilane and a carrier material as defined above with the other components of said mortars, the amount of cement in the final formulation being zero or less than 5 wt.-%, based on the total weight of the final formulation in the dry and uncured form.

In another embodiment, the objective can be also obtained with a powder comprising at least an organosilane and a carrier material suitable for hydrophobising mortars, wherein a) at least one organosilane has the formula

$$R_1Si(OR')_3 \quad (I)$$

or

$$R_1R_2Si(OR')_2 \quad (II)$$

wherein $R_1$ and $R_2$ are the same or different and are a linear or branched $C_1$- to $C_4$-alkyl and/or alkenyl group, OR' is an acetoxy, a $C_1$- to $C_4$-alkoxy and/or a $C_2$- to $C_6$-methoxyalkoxy and/or ethoxyalkoxy group, and b) the carrier material is at least one water-soluble polymer which is solid at room temperature, and wherein the weight ratio of the organosilane to the carrier material is between about 70:30 and about 1:99, and the amount of cement in the final formulation is zero or less than 5 wt. %, based on the total weight of the final formulation in the dry and uncured form.

Claimed also is a process to manufacture a dry mortar formulation, characterised in that the mortar components are dry-mixed with the inventive powder and the amount of cement in the final formulation is zero or less than 5 wt.-%, based on the total weight of the final formulation in the dry and uncured form.

The invention further provides a dry mortar formulation obtainable according to the inventive process of manufacturing dry mortar formulations.

Surprisingly, it was found that the dried hydrophobic building compounds obtained by these processes show a hydrophobic surface and/or a reduced water absorption. The achieved reduction of the water absorption according to EN 520 is typically at least about 25 wt.-%, preferably at least about 50 wt.-%, in particular at least about 75 wt.-% and more, compared to the building compound without the solid.

It was highly surprising to find that solids such as powders based on alkylalkoxysilanes with a short alkyl chain, e.g. a $C_1$- to $C_4$-alkyl chain, do hydrophobise mortars with no or less than 5 wt.-% cement, while they have no effect in cementitious mortars. On the contrary, alkylalkoxysilanes with a slightly longer alkyl chain, such as, e.g., n-octyltriethoxysilane, hydrophobise cement-based formulations, but have no or only a very minor effect in formulations containing no or less than 5 wt.-% cement, such as gypsum-based as well as cement-free and gypsum-free formulations.

Additionally, it was not to be expected at all that the obtained products would be so very storage-stable. Thus, despite their relatively high vapour pressure at room temperature, these alkylalkoxysilanes do not evaporate out of the inventive powders. Although the alkylalkoxysilanes are quite well protected by the carrier material, they obviously can be fully released at the right time when the mortar formulation containing them is mixed with water.

Furthermore, it was unexpected, and a clear strength of the inventive powder, that it has a very good wettability and disperses and/or redisperses readily upon contact with water within a few seconds, at most through light stirring. The powder as well as the solid used according to the invention leads to building compounds with no or less than 5 wt.-% cement having excellent hydrophobicity and/or showing a distinct reduction of water adsorption. Despite this fact, the wettability of these dry mortar formulations containing the powder and/or the solid with water is most typically superior over other additives giving the same or a similar effect. Additionally, it is highly advantageous that no safety hazard occurs during and after mixing of the mortar formulation with water, since no hydrogen is formed in the applied building compound, nor is bubble formation observed.

Although the preferred organosilanes have a boiling point in the range of the inlet gas temperature, or at least have a fairly high vapour pressure at this temperature, it was a major surprise that it was possible to obtain the inventive powder using such a process with no significant loss of organosilane, which was expected to evaporate during spray drying. Furthermore, it was a surprise to find that the water-soluble carrier material, acting as stabiliser of the organosilane in the aqueous emulsion, was finally forming a vapour-tight shell around the organosilane, thus encapsulating the organosilane and avoiding any significant loss of organosilane even under elevated storage conditions at, e.g., 40 and 50° C.

Because of the surprisingly high efficiency of the solid, and in particular of the powder, based on the total dry amount of the uncured mortar formulation, only small amounts need to be added. This is in contrast with what is expected, since the inventive powders contain a fairly large amount of hydrophilic, water-soluble polymer, which seems indeed to have no negative impact on the hydrophobicity and the water absorption.

Since the solid according to the invention, and in particular the inventive powder, give the mortar formulation its hydrophobic effect, it is advantageously possible to work them into a dry formulation already at the factory, which enables exact dosing and a homogeneous distribution and makes the preparation thereof particularly simple and economical. For use, this dry formulation then only has to be mixed with the corresponding amount of water and applied, which brings with it many advantages, such as for instance simple handling, simplified logistics and/or freeze-thaw resistance of the formulation. The dry mortar formulations containing no or less than 5 wt.-% cement are therefore most typically mixed with water only shortly before their application.

In the context of this invention, mortars containing no or less than 5 wt.-% cement are most typically gypsum-based or gypsum-free mortars. They are often also called "cement-free mortars" by the person skilled in the art, although they may contain up to about 5 wt.-% cement. However, preferably they contain less than about 3 wt.-%, in particular less than about 1 wt.-%, and most preferably about 0 wt.-% of cement and/or gypsum, respectively, based on the total weight of the final formulation in the dry and uncured form. The general term cement is meant to refer to Portland cement in accordance with EN 197-1 CEM I, II, III, IV and V, as well as calcium phosphate cement and/or aluminous cement such as calcium aluminate cement and calcium sulfo-aluminate cement. The general term gypsum is meant to refer to calcium sulfate in the form of α- and/or β-semihydrate and/or anhydrite of form I, II and/or III.

The organosilicon compounds can be soluble, insoluble or only partially soluble in water. However, due to their chemical nature they are often insoluble or only partially soluble in water.

The alkyl groups $R_1$ and $R_2$ of the organosilane having the formula (I) or (II) can be substituted or unsubstituted. However, substituted alkyl groups are in general less or not preferred, while in the preferred embodiment the alkyl groups are unsubstituted.

Furthermore, it is often preferred that the alkyl groups $R_1$ and $R_2$ of the organosilane having the formula (I) and/or (II) are selected from the group consisting of methyl, ethyl, n-propyl, i-propyl, n-butyl, sec-butyl, i-butyl, t-butyl, vinyl and/or allyl. Particularly preferred are the methyl, ethyl, n-propyl and/or i-propyl groups, and most preferred are the ethyl, n-propyl and/or i-propyl groups.

When OR' is an alkoxy group, it is preferably selected from the group consisting of methoxy, ethoxy, n-propoxy, i-propoxy, n-butoxy, sec-butoxy, i-butoxy and/or t-butoxy. Particularly preferred are the methoxy, ethoxy, n-propoxy and/or i-propoxy groups and most preferred are the methoxy and/or ethoxy groups.

When OR' is a methoxyalkoxy and/or an ethoxyalkoxy group, it is preferably selected from the group consisting of ethoxymethoxy, methoxyethoxy, ethoxyethoxy, methoxypropoxy, ethoxypropoxy and/or methoxybutoxy. Particularly preferred are the ethoxymethoxy, methoxyethoxy, and/or methoxypropoxy groups.

In the cited examples, the term propyl includes n-propyl and/or i-propyl, butyl includes n-butyl, i-butyl, sec-butyl and/or t-butyl, propoxy includes n-propoxy and/or i-propoxy, and butoxy includes n-butoxy, i-butoxy, sec-butoxy and/or t-butoxy.

Typical organosilanes of formula (I) are alkyl and/or alkenyl alkoxysilanes. Non-limiting examples of such include methyl, ethyl, propyl, butyl, vinyl and/or allyl trimethoxysilane; methyl, ethyl, propyl, butyl, vinyl and/or allyl triethoxysilane; methyl, ethyl, propyl, butyl, vinyl and/or allyl tripropoxysilane; methyl, ethyl, propyl, butyl, vinyl and/or allyl tributoxysilane; methyl, ethyl, propyl, butyl, vinyl and/or allyl dimethoxyethoxysilane; methyl, ethyl, propyl, butyl, vinyl and/or allyl dimethoxypropoxysilane; methyl, ethyl, propyl, butyl, vinyl and/or allyl dimethoxybutoxysilane; methyl, ethyl, propyl, butyl, vinyl and/or allyl diethoxymethoxysilane, methyl-, ethyl, propyl, butyl, vinyl and/or allyl diethoxypropoxysilane; methyl, ethyl, propyl, butyl, vinyl and/or allyl diethoxybutoxysilane; methyl, ethyl, propyl, butyl, vinyl and/or allyl dipropoxymethoxysilane; methyl, ethyl, propyl, butyl, vinyl and/or allyl dipropoxyethoxysilane, methyl, ethyl, propyl, butyl, vinyl and/or allyl dipropoxybutoxysilane; methyl, ethyl, propyl, butyl, vinyl and/or allyl dibutoxymethoxysilane; methyl, ethyl, propyl, butyl, vinyl and/or allyl dibutoxyethoxysilane; and/or methyl, ethyl, propyl, butyl, vinyl and/or allyl dibutoxypropoxysilane, with ethyl and propyl trimethoxysilane as well as ethyl and propyl triethoxysilane being particularly preferred.

Typical, non-limiting examples of organosilanes of formula (II) include dimethyl, diethyl, methylethyl, dipropyl, methylpropyl, ethylpropyl, dibutyl, methylbutyl, ethylbutyl, propylbutyl, divinyl, methylvinyl, ethylvinyl, propylvinyl, butylvinyl, diallyl, methylallyl, ethylallyl, propylallyl, butylallyl dimethoxysilane and/or the methoxyethoxy, diethoxy, methoxypropoxy, ethoxypropoxy, dipropoxy, and/or dibutoxy variants thereof, with diethyl and dipropyl dimethoxy- and/or diethoxysilane being particularly preferred.

When $R_1$, $R_2$ and/or OR' are substituted, preferred substituents are one or more amino groups and/or halogen atoms such as Cl, Br, F. Typical examples of halogenated organosilanes are chloromethyl trimethoxysilane, chloromethyl triethoxysilane, chloroethyl trimethoxysilane, chloroethyl triethoxysilane, chloropropyl trimethoxysilane, chloropropyl triethoxysilane, trifluoropropyl trimethoxysilane, trifluoropropyl triethoxysilane, trifluoropropyl tripropoxysilane, trifluoropropyl tributoxysilane and/or trifluoropropylmethyl dimethoxysilane.

Typical examples of organosilanes containing one or more amino groups are 3-aminopropyl trimethoxysilane, 3-aminopropyl triethoxysilane, N-(2-aminoethyl)-3-amino-2-methylpropyl dimethoxymethylsilane, N-(2-aminoethyl)-3-aminopropyl trimethoxysilane, 3-aminopropyl diethoxymethylsilane and trimethoxysilylpropyl diethylenetriamine, with 3-aminopropyl trimethoxysilane and/or 3-aminopropyl triethoxysilane being particularly preferred.

In another embodiment, the organosilane of formula (I) and/or (II) is an acetoxysilane, which contains as OR' group one or more acetoxy groups, such as monoacetoxysilanes, diacetoxysilanes and/or triacetoxysilanes. Non-limiting examples are methyl, ethyl, propyl, butyl, vinyl and/or allyl triacetoxysilane, methyl, ethyl, propyl, butyl, vinyl and/or allyl diacetoxymethoxysilane, methyl, ethyl, propyl, butyl, vinyl and/or allyl diacetoxyethoxysilane, methyl, ethyl, propyl, butyl, vinyl and/or allyl acetoxydimethoxysilane, methyl, ethyl, propyl, butyl, vinyl and/or allyl acetoxydiethoxysilane, and/or dimethyl, diethyl, dipropyl, dibutyl, methylvinyl and/or methylallyl diacetoxysilane.

In general, it is preferred that the solid, and in particular the powder, does not contain organosilanes with silicon-bonded hydrogen atoms and/or organopolysilanes.

The carrier material preferably is a water-soluble polymer, a combination of water-soluble and water-insoluble polymer and/or an inorganic material.

Preferred inorganic carrier materials are anticaking agents, magnesium hydrosilicates, particulate titanium dioxide, aluminas, bleaching earths, activated alumina, vermiculites such as bentonite, expanded perlite, as well as phosphates such as Na-phosphate. Especially preferred are silicic acids with a BET-surface of at least 50 m$^2$/g, in particular of at least 100 m$^2$/g.

The organic polymers as carrier materials can be water-soluble, water-insoluble and/or water-dispersible. As a rule, the organic polymer is one or more synthetic polymers and/or at least one biopolymer such as polysaccharides, peptides and/or proteins, which may have been prepared naturally and/or synthetically. The organic polymer may optionally be synthetically modified. The organic polymers, provided they are not dissolved or dispersed, are solids at room temperature and preferably higher molecular compounds. When several organic polymers are used, use can also be made of a combination of one or more natural compounds with one or more synthetically prepared compounds. Often it is advantageous when the organic polymers are water-soluble and/or water-dispersible.

Biopolymers and their derivatives preferably usable as carrier material are, e.g., cold water-soluble polysaccharides and polysaccharide ethers such as for instance cellulose ethers, starch ethers (amylose and/or amylopectin and/or their derivatives), guar ethers, dextrins and/or alginates. Also synthetic polysaccharides such as anionic, nonionic or cationic heteropolysaccharides can be used, in particular xanthan gum, welan gum and/or diutan gum. The polysaccharides can be, but do not have to be, chemically modified, for instance with carboxymethyl, carboxyethyl, hydroxyethyl, hydroxypropyl, methyl, ethyl, propyl, sulfate, phosphate and/or long-chain alkyl groups. Preferred usable peptides and/or proteins are for instance gelatine, casein and/or soy protein. Quite especially preferred biopolymers are dextrins, starches, starch ethers, casein, soy protein, gelatine, hydroxyalkyl-cellulose and/or alkyl-hydroxyalkyl-cellulose, wherein the alkyl group may be the same or different and preferably is a $C_1$- to $C_6$-group, in particular a methyl, ethyl, n-propyl- and/or i-propyl group.

Preferred synthetic, water-soluble organic polymers as carrier material can consist of one or several polymers, for instance one or more polyvinylpyrrolidones and/or polyvinylacetals with a molecular weight of 2,000 to 400,000, wholly or partially saponified polyvinyl alcohols and their derivatives, which can be modified for instance with amino groups, carboxylic acid groups and/or alkyl groups, with a degree of hydrolysis of preferably about 70 to 100 mol.-%, in particular of about 80 to 98 mol.-%, and a Floppier viscosity in 4% aqueous solution of preferably 1 to 100 mPas, in particular of about 3 to 50 mPas (measured at 20° C. in accordance with DIN 53015), as well as melamine formaldehyde sulfonates, naphthalene formaldehyde sulfonates, polymerisates of propylene oxide and/or ethylene oxide, including their copolymerisates and block copolymerisates, styrene-maleic acid and/or vinyl ether-maleic acid copolymerisates. Quite especially preferred are synthetic organic polymers, in particular partially saponified, optionally modified, polyvinyl alcohols with a degree of hydrolysis of 80 to 98 mol.-% and a Floppier viscosity as 4% aqueous solution of 1 to 50 mPas and/or polyvinyl pyrrolidone.

Preferred synthetic, water-insoluble and/or water-dispersible organic polymers as carrier material are based on emulsion and/or dispersion polymers which when dispersed in water are typically film-forming at room temperature. Most typically, they are based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styreneacrylate and/or styrene-butadiene, wherein vinyl versatate preferably is a $C_4$- to $C_{12}$-vinylester, and the polymerisates can contain about 0-50 wt.-%, in particular about 0-30 wt.-%, and quite especially preferably about 0-10 wt.-% of further monomers, in particular monomers with functional groups.

When the solid is present in the form of a powder and/or granulate, the mean diameter is typically less than about 5 mm, preferably less than about 2 mm, in particular less than about 0.5 mm, and most preferably less than about 0.2 mm, but in general at least about 10 μm or higher, preferably about 30 μm or higher, in particular about 50 μm or higher. For granulates, the mean diameter is typically between about 0.05 mm or higher, preferably about 0.1 mm or higher. For powders, the mean diameter is typically between about 20 μm and about 500 μm and preferably between about 50 μm and about 250 μm.

Furthermore, it is helpful when the solid, in particular the powder and the granulate, are readily fluid as well as block and storage-stable.

Often it is of an advantage when the solid is soluble, dispersible and/or redispersible in water, which facilitates the distribution of the organosilane in the matrix, leading to increased efficiency. When redispersed in water, the mean diameter is, e.g., about 30 μm or lower, preferably about 20 μm or lower. Methods for the determination of the mean diameter, such as, e.g., light scattering, are known to the person skilled in the art.

The weight ratio of the organosilane to the carrier material is preferably about 60:40 or lower, in particular about 50:50 or lower. Furthermore, when the carrier material is a water-soluble polymer and/or an inorganic material, the weight ratio of the organosilane to the carrier material is about 5:95 or higher, preferably about 10:90 or higher, in particular about 20:80 or higher, and when the carrier material is, e.g., a combination of a water-soluble polymer and a water-insoluble polymer, about 2:98 or higher and preferably about 5:95 or higher.

The inventive powder can be obtained by drying an aqueous emulsion of at least one organosilane and at least one water-soluble polymer and/or a combination of at least one water-soluble and at least one water-insoluble polymer. The aqueous emulsion can be obtained, e.g., by means of batch and/or continuous mixing, leading to emulsions with a preferred solids content of the organosilane and the carrier material of about 10 to about 80 wt.-%, in particular of about 25 to about 70 wt.-%, based on the total amount of aqueous emulsion.

The drying can take place by means of every suitable process. Preferred are spray drying, freeze drying, fluidised bed drying, drum drying, granulation such as for instance fluid bed granulation and/or rapid drying, with spray drying being especially preferred. Spray drying can take place for instance by means of a spraying wheel or a one-component or multi-component nozzle. If necessary, the mixture to be dried can still be diluted with water, in order to achieve a suitable viscosity for the drying. The drying temperature in principle has no real limits. However, because of safety-related considerations, the temperature of the inlet gas should not, as a rule, exceed about 200° C., in particular about 175° C. In order to attain sufficiently efficient drying, temperatures of about 110° C. or higher, in particular of about 120° C. or higher, are often preferred.

Furthermore, the solid, in the form of, e.g., a powder, granulate and/or flake, can be obtained by other processes. Other preferred means are, e.g., by adsorbing at least one organosilane onto an organic or inorganic material, and/or by granulation, drum drying, freeze drying and/or fluid bed drying. Such techniques are well known to the person skilled in the art.

In one embodiment, the solid further contains a catalyst to catalyse the hydrolysis of Si—OR' bonds to form Si—OH groups and/or to catalyse the condensation of Si—OH groups to form Si—O—Si bonds. Alternatively or in addition, if a catalyst is required, it can be added separately.

Most typically, the catalyst is a base, an acid, an amine, a fluoride salt, a metal salt, a metal complex, an organometallic and/or a metal-organic compound, the metal preferably being a transition metal and/or in the form of a powder, granulate and/or flake. If the catalyst is a liquid, it is generally advantageous when it is transformed into a solid form by means of, e.g., granulation, drying, adsorption and/or encapsulation.

Suitable basis and acids are known to the person skilled in the art. A suitable base can be, e.g., an alkaline hydroxide such as lithium, sodium and/or potassium hydroxide, and/or an alkaline-earth hydroxide and/or oxide such as magnesium, calcium, barium hydroxide and/or oxide, as well as aluminium oxide and/or hydroxide. Other bases are, e.g., alkaline and/or alkaline-earth salts of carbonates, borates, acetates, formates, aluminates, phosphates, mineral binders such as hydraulically setting binders, including cement, in particular Portland cement, for instance in accordance with EN 197-1 CEM I, II, III, IV and V, and/or aluminous cement. Preferred are sodium and/or potassium hydroxide, magnesium and/or calcium oxide and hydroxide, aluminium salts as well as cement. The base is typically used to adjust the pH of the matrix, in which the organosilane is to hydrolyse and condense, to about 8 to 14, preferably to about 10 to 13. Thus, in a preferred embodiment, the mortar containing no or less than 5 wt.-% cement is, when mixed with water, an alkaline mortar. For the sake of clarity: if cement is used as a base, the amount must be so chosen that the total amount of cement in the final formulation is zero or less than 5 wt. %, based on the total weight of the final formulation in dry and uncured form.

Suitable acids are, e.g., linear, branched, cyclic, saturated and/or unsaturated $C_1$- to $C_{20}$-, in particular $C_1$- to $C_{12}$-carboxylic or sulfonic acids.

The metal salt, metal complex, organometallic and/or metal-organic compound preferably contains at least one metal of Groups 3 to 15 of the Periodic System, in particular of Group 3 as well as Groups 14 and 15 of the Periodic System. As organometallic and/or metal-organic compounds tin, bismuth, zirconium, vanadium and/or titanium compounds are particularly preferred.

The organic groups of the metal salt, metal complex and/or organometallic compound are, e.g., ligands known from coordination chemistry, including carboxylates, polycarboxylates, hydroxycarboxylates, amines, acetylacetonates, saturated and/or unsaturated, linear and/or branched alkyl, cycloalkyl, aryl and/or alkoxy groups. Alkyl and/or carboxylate compounds are especially preferred. It is possible to use one or several of such compounds.

Non-limitative examples of suitable organometallic compounds are organotin compounds such as tinalkyl carboxylates and tin carboxylates, such as for instance dibutyltin(IV) dilaurate (DBTL), tin dioctoate, dibutyltin diacetate, dibutyltin oxide, tin(II)octoate, tin(II)acetates, tin(II)ethylcaproate, tin(II)palmitate, dibutyltin maleate, tin naphthenate, tin laurate, dibutyltin diacetyl acetonates, dioctyltin di(2-ethylhexanoate), dioctyltin dilaurate (DOTL), dioctyltin oxide, dibutyltin dicarboxylate, butyltintris-(2-ethylhexanoate), dibutyltin dineodecanoate, lauryl stannoxane, dibutyltin diketanoate, dioctyltin oxide (DOTO), dibutyltin diacetate (DBTA), dibutyltin dichloride, dibutyltin sulfide, dibutyltin oxide (DBTO), butyltin dihydroxychloride, butyltin oxide (MBTO), dibutyltin(dioctylmaleinate) and/or tetrabutyltin, organotitanium compounds such as alkyltitanates and alkyltitanate complexes, such as for instance zirconium carboxylates, tetrabutyl titanate, tetraisopropyl titanate, tetrapropyl titanate and/or tetraacetyl acetonatotitanate, organoaluminium compounds such as aluminium complexes, such as for instance trisacetylacetonatoaluminium, tris(ethylacetoacetato)aluminium, ethylacetoacetatodiisopropoxyaluminium and/or aluminium lactate, organozirconium compounds such as zirconium complexes, such as for instance zirconium carboxylates, zirconium acetylacetonate and/or zirconium tetraacetylacetonate, organozinc compounds such as zinc carboxylates and further zinc complexes, such as for instance zinc-2-ethylcaproate, zinc-2-ethylhexanoate, zinc ricinoleate, zinc octoate, zinc acetylacetonate and/or zinc oxalate, bismuth compounds such as bismuth carboxylates and other bismuth complexes, such as for instance bismuth(III) tris(neodecanoate), bismuth(III)2-ethylhexanoate, bismuth methanesulfonate, bismuth carboxylate, bismuth citrate and/or bismuth oxide.

Also, further organometallic compounds can be used, in particular based on lead, nickel, cobalt, iron, cadmium, chromium, copper and/or vanadium, such as for instance copper naphthenate, chromium acetylacetonate, iron acetylacetonate, iron naphthenate, cobalt acetylacetonate, cobalt naphthenate, molybdenum glycolates, lead octylate and/or lead naphthenate.

As amines can be used primary, secondary, tertiary and/or quaternary amines. Often linear, branched and/or cyclic alkylamines are preferred, in which case the last can also be of an aromatic nature, such as for instance imidazole and its derivatives. As an example 2-ethyl-4-methylimidazole is mentioned. If quaternary amines are used, fluorides are typically used as counter ion.

Further typical representatives of the amines are alkylamines with saturated and/or unsaturated $C_1$- to $C_{24}$-, in particular $C_1$- to $C_{12}$-, alkyl groups, wherein amines with at least one methyl, ethyl, propyl, and/or butyl group are preferred and amines with at least one methyl and/or ethyl group are quite especially preferred.

As fluoride salt basically each fluoride salt can be used. Preferred, however, are ammonium fluorides such as, e.g., tetrabutylammonium, tetramethylammonium, benzylmethylammonium and/or methylammonium fluoride and adducts thereof with carbonyl compounds such as acetylacetone, methyl acetoacetate, 2-ethylhexyl acetoacetate, isopropyl acetoacetate or ethyl acetoacetate, metal fluorides such as, e.g., lithium, sodium, potassium, caesium, zinc and/or copper fluoride, and/or organometallic fluorides such as, e.g., dibutyltin fluoride. Furthermore, phosphonium fluoride, phosphonium hydrogen fluoride, tetrafluoroborate, hexafluorosilicate or fluorophosphate are suitable fluoride salts.

It is also possible to use two or more different catalyst types, such as using a base together with, e.g., an organometallic catalyst.

The weight ratio of the catalyst to the organosilane is at least about 1:100, preferably at least about 1:25, in particular at least about 1:15 and/or at most about 1:1, preferably at most about 1:2, and in particular at most about 1:3.

According to the invention, the solid and in particular the inventive powder can contain further additives. As to the nature of the further additives no real restrictions are imposed, as long as they do not enter into any undesired reactions. Often they have an important function in mortars containing no or less than 5 wt.-% cement. If the additives are themselves powdery, they can for instance be easily added to the powder, granulate and/or flakes. If they are liquid, the addition preferably takes place before and/or during the drying step in the preparation of the additives according to the invention. In this way, for instance, also further organic polymers can be added which are water-soluble and/or water-insoluble.

Preferred further additives are powdery and/or liquid antifoaming agents, wetting agents, alkyl, hydroxyalkyl and/or alkylhydroxyalkyl polysaccharide ethers such as cellulose ethers, starch ethers and/or guar ethers, with the alkyl and hydroxyalkyl group typically being a $C_1$- to $C_4$-group, synthetic polysaccharides such as anionic, nonionic or cationic heteropolysaccharides, in particular xanthan gum or welan gum, cellulose fibres, dispersing agents, rheology control additives, in particular liquefiers, thickeners and/or casein, hydration control additives, in particular setting accelerators, solidification accelerators and/or setting inhibitors, air voids builders, polycarboxylates, polycarboxylate ethers, polyacrylamides, wholly and/or partially saponified, and optionally modified, polyvinyl alcohols, polyvinyl pyrrolidones, polyalkylene oxides and polyalkylene glycols, with the alkylene group typically being a $C_2$- and/or $C_3$-group. Included among these are also block copolymerisates, dispersions, and water-redispersible dispersion powders, also called redispersible polymer powders, based on water-insoluble film-forming polymers such as for instance based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, wherein vinyl versatate preferably is a $C_4$- to $C_{12}$-vinylester, and the polymerisates can contain about 0-50 wt.-%, in particular about 0-30 wt.-%, and quite especially preferably about 0-10 wt.-% of further monomers, in particular monomers with functional groups, further additives for hydrophobising and/or for reducing the water absorption capacity, in particular based on silanes, siloxanes, silicones, metal soaps, fatty acids and/or fatty acid esters, additives for reducing blistering such as for instance compounds based on natural resins, in particular colophony and/or its derivatives, fibres such as cellulose fibres, dispersing agents, additives for filling air voids, water retention agents and/or pigments. Fillers and/or aggregates such as quartzitic and/or carbonatic sands and/or powders such as for instance quartz sand and/or limestone powder, carbonates, silicates, chalks, layered silicates, precipitated silicas, light-weight fillers such as for instance hollow microspheres of glass, polymers such as polystyrene spheres, alumosilicates, silica, aluminium-silica, calcium-silicate hydrate, silicon dioxide, aluminium-silicate, magnesium-silicate, aluminium-silicate hydrate, calcium-aluminium-silicate, calcium-silicate hydrate, aluminium-iron-magnesium-silicate, calcium-metasilicate, clays such as bentonite and/or vulcanic slag, as well as pozzolanes such as metakaolin and/or latently hydraulic components, in which case the fillers and/or light-weight fillers can also have a natural or artificially generated colour.

Particularly preferred additives are polymer dispersions, redispersible polymer powders, further polysaccharide ethers, wetting agents, and hydrophobising agents such as siloxanes, fatty acids and/or fatty acid esters as well as rheology control additives and additives to reduce efflorescence.

The amount of these additives added to the solid, in particular in the form of a powder, granulate and/or flakes, can vary within a broad range. For surface-active materials for instance the proportion of these additives can be very small and be in the range of about 0.01 wt.-% or higher, in particular about 0.1 wt.-% and higher, but as a rule will not exceed about 10 wt.-%, in particular about 5 wt.-%, based on the sum of the organosilane and the carrier material. On the other hand, for instance the proportion of water-redispersible polymer powder can be higher and can also be up to, e.g., the 200-fold amount or higher, based on the sum of the organosilane and the carrier material.

Due to the high efficiency of the solid, and in particular of the powder, only small amounts are required, based on the total dry amount of the uncured mortar formulation. Typically, the solid is added to the dry mortar formulation in an amount such that the amount of hydrolysable organosilane is 1.0 wt.-% or lower, preferably 0.5 wt.-% or lower, in particular 0.2 wt.-% or lower, and most preferably 0.1 wt.-% or lower, based on the dry weight of the formulation. The additional amounts of hydrolysable organosilane are, however, typically at least 0.001 wt.-% and preferably at least 0.01 wt.-%, based on the dry weight of the formulation.

The instant mortar formulations in which the amount of cement is zero or less than 5 wt. %, based on the total weight of the final formulation in the dry and uncured form preferably are building material formulations with or without minerally setting components. By this the skilled person means in particular mortar, concrete, plasters, coating systems, and construction adhesives. These formulations typically contain one or more binders.

In a preferred embodiment, the solids, in particular in the form of a powder, granulate and/or flakes, are used in gypsum-based formulations. Such formulations as a rule have a proportion of gypsum of at least 70 wt.-%, in particular of at least 90 wt.-%, calculated on the overall proportion of mineral binder, with this being, calculated on the dry content of the formulation, at least 15 wt.-%, preferably at least 20 wt.-%, in particular at least 35 wt.-%.

In another preferred embodiment, the mass containing no or less than 5 wt.-% cement is a so-called cement-free and gypsum-free mortar, but it contains another mineral binder, in particular a latent hydraulic binder, although also other hydraulic and/or non-hydraulic binders can be used.

In yet another preferred embodiment, the mass contains no mineral binder or less than 5 wt.-%, preferably less than 3 wt.-%, in particular less than 1 wt.-% thereof, calculated on the dry content of the formulation. Besides the mineral binder, both embodiments can also additionally contain non-mineral binders.

In many cases it is advantageous when the mortars, when mixed with the same amount of water, show a pH-value of 7.5 or higher, preferably of 8.0 or higher, in particular of pH 10 or higher, when measured at room temperature.

In the context of the invention, non-mineral binders are solid materials as well as high- and/or low-viscous liquids. Preferred are water-soluble and/or water-dispersible polymers such as film-forming dispersions and/or redispersible powders based on emulsion polymers, as well as epoxide resins.

Often, but not as a rule, the dry mortar formulation contains at least one minerally setting binder, which is added only in very small amounts, or else as main component, to the dry mortar formulation.

Mineral binders are, in the context of the invention, binders which are typically solids and in particular consist of at least a) a hydraulically setting binder, in particular activated blast furnace slags and/or silico-calcareous fly ash, b) a latent hydraulic binder, such as in particular pozzolanes and/or metakaolin, which reacts hydraulically in combination with a calcium source such as calcium hydroxide and/or cement, and/or c) a non-hydraulic binder which reacts under the influence of air and water, in particular gypsum, by which is meant in this invention in particular calcium sulfate in the form of α- and/or β-semihydrate and/or anhydrite of form I, II and/or III, calcium hydroxide, calcium oxide, quicklime, hydrated lime, magnesia cements and/or water glass.

However, as further hydraulically setting binders also cement be used, provided that the amount of cement in the final formulation is zero or less than 5 wt.-%, based on the total weight of the final formulation in the dry and uncured form. Preferred cements are in particular Portland cement, for instance in accordance with EN 197-1 CEM I, II, III, IV and V, and/or calcium phosphate cement and/or aluminous cement such as calcium aluminate cement, calcium sulfoaluminate cement.

Preferred latent hydraulic binders pozzolanes are metakaolin, burnt shale, diatomeous earth, moler, rice husk ash, air cooled slag, calcium metasilicate and/or vulcanic slag, vulcanic tuff, trass, fly ash, silica fume, microsilica, blast-furnace slag, and/or silica dust.

Preferred non-hydraulic binder are gypsum, by which is meant in this invention in particular calcium sulfate in the form of α- and/or β-semihydrate and/or anhydrite of form I, II and/or III, calcium hydroxide, calcium oxide, lime such as quicklime and/or hydrated lime, magnesia cements and/or water glass.

In one preferred embodiment the dry mortar formulation according to the invention is a gypsum dry mortar, wherein the proportion of gypsum, calculated on the dry mortar, is at least about 15 wt.-%, preferably at least about 20 wt.-%, and in particular at least about 35 wt.-%, based on the total weight of the dry, uncured mortar formulation.

Such dry mortar formulations preferably contain about 15 to 75 wt.-%, in particular about 20 to 70 wt.-%, quite especially preferably about 30 to 65 wt.-%, of at least one type of gypsum, about 20 to 80 wt.-%, in particular about 25 to 75 wt.-%, quite especially preferably about 30 to 65 wt.-%, of at least one filler and/or aggregate, about 0.01 to 5 wt.-%, in particular 0.05 to 3 wt.-%, quite especially preferably about 0.1 to 2 wt.-%, of the powder, granulate and/or flakes to be used according to the invention, as well as up to about 5 wt.-%, in particular 3 wt.-% of further additives such as for instance polysaccharide ethers such as cellulose ethers and the alkyl and/or hydroxyalkyl derivatives thereof, retardants and/or accelerators, surface-active substances such as defoamers and/or wetting agents and water-redispersible polymer powders, also called redispersion powders, and further additives known to the skilled person. All amounts are based on the total weight of the final formulation in the dry and uncured form.

In another embodiment the dry mortar formulation contains no or less than about 5 wt.-%, in particular less than about 2.5 wt.-%, calculated on the dry content of the dry, uncured mortar formulation, of a minerally, in particular hydraulically, setting binder.

Such dry mortar formulations preferably contain about 50 to 99.9 wt.-%, in particular about 60 to 95 wt.-% of at least one filler and/or aggregate, about 0.01 to 5 wt. %, in particular 0.05 to 3 wt. %, quite especially preferably about 0.1 to 2 wt.-%, of the powder, granulate and/or flakes to be used according to the invention, about 3 to 40 wt.-%, in particular about 5 to 30 wt.-% of water-redispersible polymer powder, as well as up to about 15 wt.-%, in particular up to about 10 wt.-% of further additives such as for instance polysaccharide ethers such as cellulose ethers and the alkyl and/or hydroxyalkyl derivatives thereof, cellulose fibres, retardants and/or accelerators, surface-active substances such as defoamers and/or wetting agents, optionally minerally setting binders, as well as further additives known to the skilled person. All amounts are based on the total weight of the final formulation in the dry, uncured form.

Suitable aggregates and/or fillers are known to the skilled person. Non-limiting examples are quartzitic and/or carbonatic sands and/or powders such as for instance quartz sand and/or limestone powder, carbonates, silicates, chalks, layered silicates and/or precipitated silicas. Furthermore, use may be made of light-weight fillers such as for instance hollow microspheres of glass, polymers such as polystyrene spheres, alumosilicates, silica, aluminium-silica, calcium-silicate hydrate, aluminium-silicate, magnesium-silicate, aluminium-silicate hydrate, calcium-aluminium-silicate, calcium-silicate hydrate silica, and/or aluminium-iron-magnesium-silicate, but also of clays such as bentonite, in which case the fillers and/or light-weight fillers can also have a natural or artificially generated colour.

The dry mortar formulations according to the invention can be formulated for instance as coating or composite mortar, mixtures to make plaster boards, thermal insulation mortar, sealing compounds, gypsum and/or lime and/or cement plasters, repair mortar, joint adhesives, tile adhesives, in particular ceramic tile adhesives, plywood-mortar, mortar for mineral bonding agents, cement primers, concrete coating mortar, powder coatings, parquet adhesives, skim coats, levelling compounds and/or screeds. Thanks to the hydrophobicity and low water absorption obtained by the addition of the solid according to the invention, such mortars can be used in the outdoor as well as the indoor area. Preferably, they are used in drywall installation, in plastering, in the handyman and do-it-yourself area, and have been formulated as plaster glue, smoothing mortar, finish mortar, joint filler, joint sealer, tile adhesive, stucco work and/or moulding plaster composition, levelling compound, gypsum screed, gypsum, gypsum-lime and/or synthetic resin plaster, pasty adhesive and/or water-based coating or are used for producing gypsum plaster boards.

The inventive dry mortar formulation containing no or less than 5 wt.-% cement, based on the total weight of the final formulation in the dry and uncured form obtained by dry mixing the mortar components with the solid, in particular with the inventive powder, can be further processed by mixing the obtained dry mortar formulation with water and applying it onto a substrate or casting it into a mould, and allowing it to dry. The drying can typically occur at ambient conditions and/or at elevated temperatures. The latter is particularly preferred when moulded articles are manufactured.

Alternatively, it is also possible for the solid to be added as a separate component directly before, during and/or after the mixing of the dry mortar formulation that does not yet contain the solid with water. In another embodiment, the solid is first dissolved, dispersed and/or redispersed in water, e.g., in the mixing water, and mixed with the dry mortar formulation by this method. At all times, it must be ensured that the amount of cement in the final formulation is zero or less than 5 wt. %, based on the total weight of the final formulation in the dry and uncured form.

In another process for making hydrophobic building compounds containing no or less than 5 wt.-% cement, the solid according to the invention, preferably in the form of a powder, granulate and/or flake, is applied onto the surface of building compounds containing no or less than 5 wt.-% cement as an aqueous solution, dispersion and/or redispersion and is allowed to dry.

Non-limiting examples of such substrates are mineral building materials, bricks, component parts and/or constructions, mineral construction materials, such as lime sandstone, granite, lime, gypsum, marble, perlite, porous and non-porous tiles, natural stone, screed, clay articles but also artificial stone, masonries, facades, roofs, bricks and/or terracotta.

This process leads to the hydrophobisation of the finally obtained matrix, which is also called mass hydrophobisation of the mortar, the latter containing no or less than 5 wt.-% cement, based on the dry, uncured mortar formulation.

In addition, this process of using the solid and in particular the inventive powder is also suitable for protecting masses and/or metals against corrosion, in which case the metal is coated with a layer containing the hydrolysed and condensated organosilane.

The invention is further elucidated with reference to the following examples. Unless indicated otherwise, the experiments were carried out at a temperature of 23° C. and a relative humidity of 50%.

EXAMPLE 1

Preparation of Powder 1

To 100 g of a 20% aqueous polyvinyl alcohol solution with a degree of hydrolysis of 88 mol.-% and a Höppler viscosity as 4% solution of 4 mPas in a 500 ml glass vessel with a propeller stirrer with a stirring speed of 1,000 rpm, were added slowly at room temperature 13.3 g of n-propyltriethoxysilane, with the silane being emulsified completely. The obtained emulsion was subsequently dried without further additives by means of conventional spray drying at an initial temperature of 125° C. to a white, free-flowing and readily water-redispersible powder in good yield, in which process no significant fouling occurred in the spraying tower.

EXAMPLE 2

Preparation of Powder 2

Example 1 was repeated, except that 2.5 g methyltriethoxysilane and 2.5 g n-propyltriethoxysilane were added as silane component. The spray drying resulted in a white, free-flowing, and readily water-redispersible powder in good yield, in which process no significant fouling occurred in the spraying tower.

EXAMPLE 3

Preparation of Powder 3

Example 1 was repeated, except that 5.0 g n-propyltriethoxysilane were added as silane component. The spray drying resulted in a white, free-flowing, and readily water-redispersible powder in good yield, in which process no significant fouling occurred in the spraying tower.

EXAMPLE 4

Preparation of Powder 4

To 10 g Perlite F (Zimmerli Mineralwerk AG) 4.0 g n-propyltriethoxysilane were added dropwise in a 100 ml container with stirring at 1,000 rpm. A white, free-flowing, and homogeneous powder was obtained.

EXAMPLE 5

Preparation of Powder 5

To 10 g Perlite F (Zimmerli Mineralwerk AG) 4.0 g n-propyltriethoxysilane were added dropwise in a 100 ml container with stirring at 1,000 rpm. A white, free-flowing, and homogeneous powder was obtained.

EXAMPLE 6 (REFERENCE)

Preparation of Powder 6

Example 1 was repeated, except that 5.0 g n-octyltriethoxysilane were added as silane component. A white, free-flowing, and homogeneous powder was obtained.

EXAMPLE 7

Preparation of a Gypsum-Based Dry Mortar Master Batch TM-1

Prepared were 5 kg dry mortar master batch TM-1, consisting of 420 parts by weight of Almod Beta gypsum, 100 parts by weight of Alpha gypsum, 305 parts by weight of a natural calcium carbonate (Omyacarb BG10), 55 parts by weight of an aluminium-silicate (kaolin), 90 parts by weight of magnesium-aluminium-silicate hydrate (Plastorit), 20 parts by weight of a commercially available redispersible polymer powder on an ethylene-vinyl acetate copolymerisate (Elotex MP2080), 3 parts by weight of a commercially available cellulose ether, 2 parts by weight of calcium hydroxide, and 0.1 part by weight of a commercially available retarder (Retardan P). The components were mixed in a 10 l vessel with a FESTO stirrer until a homogeneous dry mortar master batch was obtained.

EXAMPLE 8

Preparation of Cement- and Gypsum-Free Dry Mortar Master Batch TM-2

Dry mortar master batch TM-2 was prepared in analogous manner to TM-1, but with use being made of 696 parts by weight of calcium carbonate (Omyacarb BG10), 200 parts by weight of a magnesium aluminium silicate hydrate (Plastorit), 100 parts by weight of aluminium silicate (China Clay), 4 parts by weight of a cellulose ether, 3 parts by weight of calcium hydroxide, and 30 parts by weight of a commercially available redispersible polymer powder based on an ethylene-vinyl acetate copolymerisate (Elotex MP2080).

EXAMPLE 9 (REFERENCE)

Preparation of Cement-Based Dry Mortar Master Batch TM-3

Dry mortar master batch TM-3 was prepared in analogous manner to TM-1, but with use being made of 340 parts by weight of Portland cement CEM I 42.5 R, 603 parts by weight quartz sand 0.1-0.5 mm, 30 parts by weight calcium hydroxide, 2 parts by weight cellulose ether, and 20 parts by weight of a commercially available redispersible polymer powder based on an ethylene-vinyl acetate copolymerisate (Elotex FX2320).

Preparation of Mortar Premixes:

100 parts by weight of TM-1 and TM-2, respectively, were added to 42 parts by weight of water while stirring slowly. This mixture was further stirred for one minute with a 40 mm propeller stirrer with a speed of 950 rpm. After a maturing time of 3 minutes the mortar was again stirred by hand for 15 seconds and applied.

The same procedure was applied when mixing TM-3 with water, but only 21 parts by weight of water were used and the water was added to TM-3.

EXAMPLE 10

Determination of the Water Absorption of Gypsum Mortars on EPS-boards, Following EN520

The mixed mortar premixes after 3 minutes of maturing time were applied by means of 2 mm thick spacing means onto 10 mm thick EPS-boards (Expanded Polystyrene; 15 kg/m$^3$) and stored at 23° C./50% relative humidity for 7 days. After 6 days polypropylene cylinders with a diameter of 83 mm and a height of 20 mm were cemented on with the aid of silicone cement.

The boards were weighed, with the cemented on cylinders subsequently being filled with 90 g of water and left for 2 hours. After removal of the remaining water the wet surface was wiped off and reweighed. The water absorption is calculated from the difference in the weight values measured before and after the water treatment, which is indicated in kg/m$^2$.

TABLE 1

Determination of the water absorption of the applied and dried gypsum mortar TM-1 on EPS-boards, following EN520. All examples revealed a good mortar workability.

| Exp. No. | Additive added Type | Amount (wt.-%)[a] | Water absorption [kg/m$^2$] |
|---|---|---|---|
| A-1 | N/A | 0 | 0.92 |
| A-2 | Silane MTMS[b] | 0.2 | 0.11 |
| A-3 | Silane PTES[c] | 0.2 | 0.29 |
| A-4 (Ref) | Silane OTES[d] | 0.5 | 0.96 |
| A-5 (Ref) | Silane PhTMS[e] | 0.5 | 0.84 |
| A-6 (Ref) | Silane PTES + PVOH[f] | 0.1 + 0.4 | 0.62 |
| A-7 | Powder 1 | 0.5 | 0.30 |
| A-8 | Powder 2 | 0.5 | 0.22 |
| A-9 | Powder 2 | 1.0 | 0.12 |
| A-10 | Powder 3 | 0.5 | 0.15 |
| A-11 | Powder 5 | 0.7 | 0.16 |
| A-12 (Ref) | Powder 6 | 0.5 | 0.76 |
| A-13 (Ref) | Powder 6 | 1.0 | 0.74 |
| A-14 (Ref) | Oligosilane 1[g] | 0.5 | 0.94 |
| A-15 (Ref) | Oligosilane 1[g] | 1.0 | 0.82 |
| A-16 (Ref) | Oligosilane 2[h] | 0.5 | 0.78 |

[a]The TM-1 dry mortar master batch was supplemented to 100 wt.-%.
[b]Silane MTMS stands for methyl triethoxysilane
[c]Silane PTES stands for n-propyl triethoxysilane
[d]Silane OTES stands for n-octyl triethoxysilane
[e]Silane PhTMS stands for phenyl trimethoxysilane
[f]Silane PTES was added to TM-1 separately from the polyvinyl alcohol (PVOH; the same type was used as specified in Example 1). The latter was dissolved in water before it was added. The added amounts of the components are the same as the ones of powder 3.
[g]Oligosilane 1 is an oligomeric mixture of n-propyl triethoxysilane with a degree of oligomerisation of 2 and higher.
[h]Oligosilane 2 is an oligomeric mixture of methyl triethoxysilane with a degree of oligomerisation of 2 and higher.

The results from Tables 1 and 2 indicate that already small amounts of inventive powder reduce the water absorption of the applied and dried gypsum-based mortar TM-1 as well as of the applied and dried gypsum-free mortar TM-2. However, alkylalkoxysilanes which are the active ingredients in powders which hydrophobise cementitious systems (e.g. Powder 6 as well as Silane OTES and Silane PhTMS, even at higher concentration) do not show any relevant hydrophobicity and reduction of the water absorption. The same, namely no significant enhancement of the hydrophobicity, is found when oligosilanes are used, as demonstrated by Examples A-14 to A-16. This is also found to be the case when the oligosilanes are used in the gypsum-free mortar TM-2.

When comparing the water absorption results of Reference Example A-6 in comparison to Example A-10 of Table 1, it is impressive to see that the sole presence of the two components Silane PTES and PVOH does not contribute much to reducing the water absorption. However, the same composition after, e.g., emulsification of the silane with a carrier such as PVOH and subsequent drying of the obtained mixture, reduces—when added as a powder—significantly the water absorption of the dried building compound containing no or less than 5 wt.-% cement.

Furthermore, it is interesting to see that increasing the silane concentration in powders according to the invention does not necessarily lead to improved hydrophobicity at the same powder concentration—and therefore at increased silane loading—as observed with Powder 1 (Exp. A-7) in comparison to Powder 3 (Exp. A-10) in Table 1. While this phenomenon is not yet fully understood, it is believed that a lower dosage of silanes leads to better distribution in the mortar matrix, which prevents a too fast condensation. Additionally, the increased amount of carrier material (polyvinyl alcohol) in Powder 3 compared to Powder 1 seems to have a positive rather than a negative impact on the water absorption.

TABLE 2

Determination of the water absorption of the applied and dried gypsum-free mortar TM-2 on EPS-boards, following EN520. All examples revealed a good mortar workability.

| Exp. No. | Additive added | | Water absorption |
|---|---|---|---|
| | Type | Amount (wt.-%)[a] | [kg/m$^2$] |
| B-1 | N/A | 0 | 0.41 |
| B-2 | Powder 1 | 0.5 | 0.25 |
| B-3 | Powder 3 | 0.5 | 0.33 |
| B-4 (Ref) | Powder 6 | 0.5 | 0.48 |

[a]The TM-2 dry mortar master batch was supplemented to 100 wt.-%.

EXAMPLE 11

Determination of the Surface Hydrophobicity

The mixed mortar premixes after 3 minutes of maturing time were applied by means of 2 mm thick spacing means onto 10 mm thick EPS-boards (Expanded Polystyrene; 15 kg/m$^3$) and stored at 23° C./50% relative humidity for 7 days. 5 drops (0.2 ml) of water were applied onto the mortar surface and the time was measured until the water had disappeared from the surface.

TABLE 3

Determination of the surface hydrophobicity of the applied and dried gypsum mortar TM-1 on EPS-boards. All examples revealed a good mortar workability.

| Exp. No. | Additive added | | Time until water disappeared [min] |
|---|---|---|---|
| | Type | Amount (wt.-%)[a] | |
| C-1 | N/A | 0 | 3 |
| C-2 | Powder 1 | 0.5 | 380 |
| C-3 | Powder 4 | 0.5 | 300 |
| C-4 (Ref.) | Powder 6 | 0.5 | 25 |
| C-5 (Ref.) | Powder 6 | 1.0 | 20 |

[a]The TM-1 dry mortar master batch was supplemented to 100 wt.-%.

TABLE 4

Determination of the surface hydrophobicity of the applied and dried gypsum-free mortar TM-2 on EPS-boards. All examples revealed a good mortar workability.

| Exp. No. | Additive added | | Time until water disappeared [min] |
|---|---|---|---|
| | Type | Amount (wt.-%)[a] | |
| D-1 | N/A | 0 | 20 |
| D-2 | Powder 1 | 0.5 | 430 |
| D-3 | Powder 3 | 0.5 | 360 |
| D-4 (Ref.) | Powder 6 | 0.5 | 120 |

[a]The TM-1 dry mortar master batch was supplemented to 100 wt.-%.

The results from Tables 3 and 4 demonstrate impressively that already small amounts of inventive powders improve the surface hydrophobicity drastically. However, while powders based on alkylalkoxysilanes which can be used to hydrophobise cementitious systems (e.g. Powder 6) do not show any relevant hydrophobicity in gypsum-based mortars, they impart a strong reduction of the water absorption as well as providing an excellent surface hydrophobicity in cement-based mortars, as the results from Table 5 reveal.

TABLE 5

Determination of the surface hydrophobicity of the applied and dried cement-based mortar TM-3 (Reference) on EPS-boards. All examples revealed a good mortar workability.

| Exp. No. | Additive added | | Time until water disappeared [min] |
|---|---|---|---|
| | Type | Amount (wt.-%)[a] | |
| E-1 | N/A | 0 | 3 |
| E-2 | Powder 3 | 0.5 | 3 |
| E-3 (Ref) | Powder 6 | 0.5 | 360 |

[a]The TM-3 dry mortar master batch was supplemented to 100 wt.-%.

These results show clearly that the inventive powders improve the hydrophobicity of gypsum-based formulations as well as of cement-free and gypsum-free formulations significantly, while the water absorption is reduced impressively. However, powders based on other silicon-containing compounds such as e.g. octyl triethoxysilane and organopolysiloxanes do not increase the hydrophobicity of these mortars.

The invention claimed is:

1. A process to hydrophobise a mortar formulation, the process comprising:
   mixing a solid with the mortar formulation, the solid comprising at least one organosilane and a carrier material, wherein
   a) the organosilane has the formula $$R_1Si(OR')_3 \quad (I)$$

or $$R_1R_2Si(OR')_2 \quad (II)$$

wherein $R_1$ and $R_2$ are the same or different and are a linear or branched $C_1$- to $C_4$-alkyl and/or alkenyl group, OR' is an acetoxy, a $C_1$- to $C_4$-alkoxy and/or a $C_2$- to $C_6$-methoxyalkoxy and/or ethoxyalkoxy group, and
   b) the carrier material is solid at room temperature, and wherein the weight ratio of the organosilane to the carrier material is between 70:30 and 1:99; the solid is in the form of a powder, a granulate and/or a flake; and the amount of cement in the final mortar formulation is zero or less than 5 wt.-%, based on the total weight of the final mortar formulation in the dry and uncured form.

2. The process according to claim 1, wherein the final mortar formulation containing zero or less than 5 wt.-% cement is a gypsum-based or a gypsum-free mortar.

3. The process according to claim 1, wherein $R_1$ is selected from the group consisting of methyl, ethyl, n-propyl, i-propyl, n-butyl, sec-butyl, i-butyl, t-butyl, vinyl and allyl; and wherein $R_2$ is selected from the group consisting of methyl, ethyl, n-propyl, i-propyl, n-butyl, sec-butyl, i-butyl, t-butyl, vinyl and allyl.

4. The process according to claim 1, wherein the alkoxy group is selected from the group consisting of methoxy, ethoxy, n-propoxy, i-propoxy, n-butoxy, sec-butoxy, i-butoxy and t-butoxy.

5. The process according to claim 1, wherein the carrier material is selected from the group consisting of a water-soluble polymer, a combination of a water-soluble and a water-insoluble polymer, a water-dispersible polymer, an inorganic material, and combinations thereof.

6. The process according to claim 1, wherein the solid further comprises a catalyst to catalyze the hydrolysis of Si—OR' bonds to form Si—OH groups and/or to catalyze the condensation of Si—OH groups to form Si—O—Si bonds.

7. The process according to claim 6, wherein the catalyst is selected from the group consisting of a base, an amine, a metal salt, a metal complex, and combinations thereof; and wherein the catalyst is in the form of a powder, a granulate or a flake.

8. The process powder according to claim 2, wherein $R_1$ is selected from the group consisting of methyl, ethyl, n-propyl, i-propyl, n-butyl, sec-butyl, i-butyl, t-butyl, vinyl and allyl; and wherein $R_2$ is selected from the group consisting of methyl, ethyl, n-propyl, i-propyl, n-butyl, sec-butyl, i-butyl, t-butyl, vinyl and allyl.

9. The process according to claim 3, wherein the alkoxy group is selected from the group consisting of methoxy, ethoxy, n-propoxy, i-propoxy, n-butoxy, sec-butoxy, i-butoxy and t-butoxy.

10. The process according to claim 3, wherein the carrier material is selected from the group consisting of a water-soluble polymer, a combination of a water-soluble and a water-insoluble polymer, a water-dispersible polymer, an inorganic material, and combinations thereof.

11. The process according to claim 4, wherein the solid further comprises a catalyst to catalyze the hydrolysis of Si—OR' bonds to form Si—OH groups and/or to catalyze the condensation of Si—OH groups to form Si—O—Si bonds.

12. The process according to claim 7, wherein the metal is a transition metal.

13. A powder comprising at least one organosilane and a carrier material, wherein
   c) the organosilane has the formula $$R_1Si(OR')_3 \qquad (I)$$

or $$R_1R_2Si(OH)_2 \qquad (II)$$

wherein $R_1$ and $R_2$ are the same or different and are a linear or branched $C_1$- to $C_4$-alkyl and/or alkenyl group, OR' is an acetoxy, a $C_1$- to $C_4$-alkoxy and/or a $C_2$- to $C_6$-methoxyalkoxy and/or ethoxyalkoxy group, and
   c) the carrier material is at least one water-soluble polymer which is solid at room temperature, and
   wherein the weight ratio of the organosilane to the carrier material is between 70:30 and 1:99.

14. A process to manufacture a dry mortar formulation containing zero or less than 5 wt.-% cement, based on the total weight of the dry and uncured mortar formulation, the process comprising:
   dry mixing the mortar components with the powder according to claim 13.

15. The process according to claim 14, wherein the powder is mixed with the dry mortar components in such an amount that the amount of organosilane is 1.0 wt.-% or lower, based on the dry weight of the formulation.

16. A dry mortar formulation containing the powder of claim 13, and zero or less than 5 wt.-% cement, based on the total weight of the dry and uncured mortar formulation.

17. The dry mortar formulation according to claim 16, wherein the powder is present in such an amount that the amount of organosilane is 1.0 wt.-% or lower, based on the dry weight of the formulation.

18. The process according to claim 14, wherein the powder is mixed with the dry mortar components in such an amount that the amount of organosilane is 0.2 wt.-% or lower, based on the dry weight of the formulation.

19. The dry mortar formulation according to claim 16, wherein the powder is present in such an amount that the amount of organosilane is 0.5 wt.-% or lower, based on the dry weight of the formulation.

20. The dry mortar formulation according to claim 16, wherein the powder is present in such an amount that the amount of organosilane is 0.2 wt.-% or lower, based on the dry weight of the formulation.

* * * * *